(12) United States Patent
Kennefick

(10) Patent No.: US 9,940,420 B2
(45) Date of Patent: *Apr. 10, 2018

(54) MONOLITHIC STRUCTURE WITH A ROTATION IN A SHEARABLE MEDIUM

(71) Applicant: Christine Marie Kennefick, Reston, VA (US)

(72) Inventor: Christine Marie Kennefick, Reston, VA (US)

(*) Notice: Subject to any disclaimer, the term of this patent is extended or adjusted under 35 U.S.C. 154(b) by 256 days.

This patent is subject to a terminal disclaimer.

(21) Appl. No.: 14/877,041

(22) Filed: Oct. 7, 2015

(65) Prior Publication Data

US 2016/0342714 A1    Nov. 24, 2016

Related U.S. Application Data

(63) Continuation-in-part of application No. 14/719,345, filed on May 22, 2015.

(51) Int. Cl.
*G06F 17/50* (2006.01)

(52) U.S. Cl.
CPC ...... *G06F 17/5068* (2013.01); *G06F 17/5009* (2013.01); *G06F 2217/16* (2013.01); *G06F 2217/80* (2013.01)

(58) Field of Classification Search
CPC ............ G06F 17/5009; G06F 17/5068; G06F 2217/16; G06F 2217/80
See application file for complete search history.

(56) References Cited

U.S. PATENT DOCUMENTS

| | | | |
|---|---|---|---|
| 6,744,176 B2 | 6/2004 | Dinger | |
| 7,117,133 B2 | 10/2006 | Chen | |
| 8,082,130 B2* | 12/2011 | Guo | B82Y 10/00 703/2 |
| 8,459,806 B2 | 6/2013 | Mimura et al. | |
| 8,509,928 B2 | 8/2013 | Abate et al. | |
| 8,700,364 B2 | 4/2014 | Looney et al. | |
| 8,706,455 B2 | 4/2014 | Van Beurden et al. | |
| 8,833,510 B2 | 9/2014 | Koh et al. | |
| 9,026,407 B1* | 5/2015 | Kennefick | G06T 19/20 703/1 |
| 9,058,798 B2 | 6/2015 | Walker et al. | |
| 9,081,123 B2 | 7/2015 | Bowers et al. | |
| 9,081,202 B2 | 7/2015 | Bowers et al. | |
| 9,083,082 B2 | 7/2015 | Bowers et al. | |
| 9,123,753 B2 | 9/2015 | Porto | |

(Continued)

*Primary Examiner* — Aniss Chad

(57) ABSTRACT

A monolithic structure designed to be built with relatively few manufacturing steps comprises three dimensional elements enclosed by planar faces, a rotation within a shearable medium, a strain arising from the rotation, and potential energy configurations that are dependent upon the strain. A first tensor for strain or displacement within a shearable medium is derived from the rotation. A configuration of a potential energy, its gradient or a potential energy per unit volume in the structure is derived from a second tensor whose coefficients can be derived from a sum of constants and trigonometric functions. A new energy configuration is defined when parameters and coefficients of the second tensor become dependent upon the rotation and its subsequent strain. Drawings illustrate several views and examples of the interaction between the rotation, tensors and three dimensional elements.

2 Claims, 8 Drawing Sheets

(56) References Cited

U.S. PATENT DOCUMENTS

| | | | |
|---|---|---|---|
| 2005/0095137 A1* | 5/2005 | Ganesh | B21K 1/10 |
| | | | 416/244 A |
| 2013/0011623 A1* | 1/2013 | Jones | D03D 11/02 |
| | | | 428/160 |
| 2013/0063425 A1* | 3/2013 | Watanabe | G06T 19/00 |
| | | | 345/419 |
| 2014/0005983 A1* | 1/2014 | Baer | G06F 17/5018 |
| | | | 703/1 |
| 2015/0353430 A1 | 12/2015 | Natsui et al. | |
| 2016/0093420 A1 | 3/2016 | Urzhumov | |

\* cited by examiner

MONOLITHIC STRUCTURE WITH A ROTATION IN A SHEARABLE MEDIUM

BACKGROUND

Material structures can sometimes be difficult to move forward economically if they encompass layers or patterns requiring lithography because fabrication entails additional manufacturing steps. Another factor that might be considered is that modeling new structures might yield limited accuracy around intricately shaped micro elements. In an effort to reduce these difficulties in expense, time and length scale, a monolithic structure is presented that derives from a rotation and tensors that rapidly become dependent upon one another. Coefficients of tensors, which can be sums of constants and trigonometric functions, provide a common configurational form to link electronic, atomic and mechanical quantities at a micro scale. A model of a simple monolithic structure comprises three dimensional elements enclosed by planar faces. Tensors used to derive potential energy become dependent upon a rotational displacement within a shearable medium.

SUMMARY

A monolithic structure comprises one or more elements enclosed by planar faces, a rotation, and configurations of potential energy that can be derived from the rotation. Tensors whose coefficients can be sums of constants and trigonometric functions provide a common derivation of atomic, electronic and mechanical physical quantities that interact with each other in a monolithic structure that comprises intricately shaped three dimensional elements enclosed by planar faces. A rotation of one or more of the elements gives rise to a strain within a monolithic shearable medium. A rotation angle is one parameter in coefficients of a first tensor that computes a strain arising from the rotation. Other tensors, whose coefficients are used to derive potential energy, become dependent upon coefficients and parameters of the first tensor.

DETAILED DESCRIPTION

Figure 1:
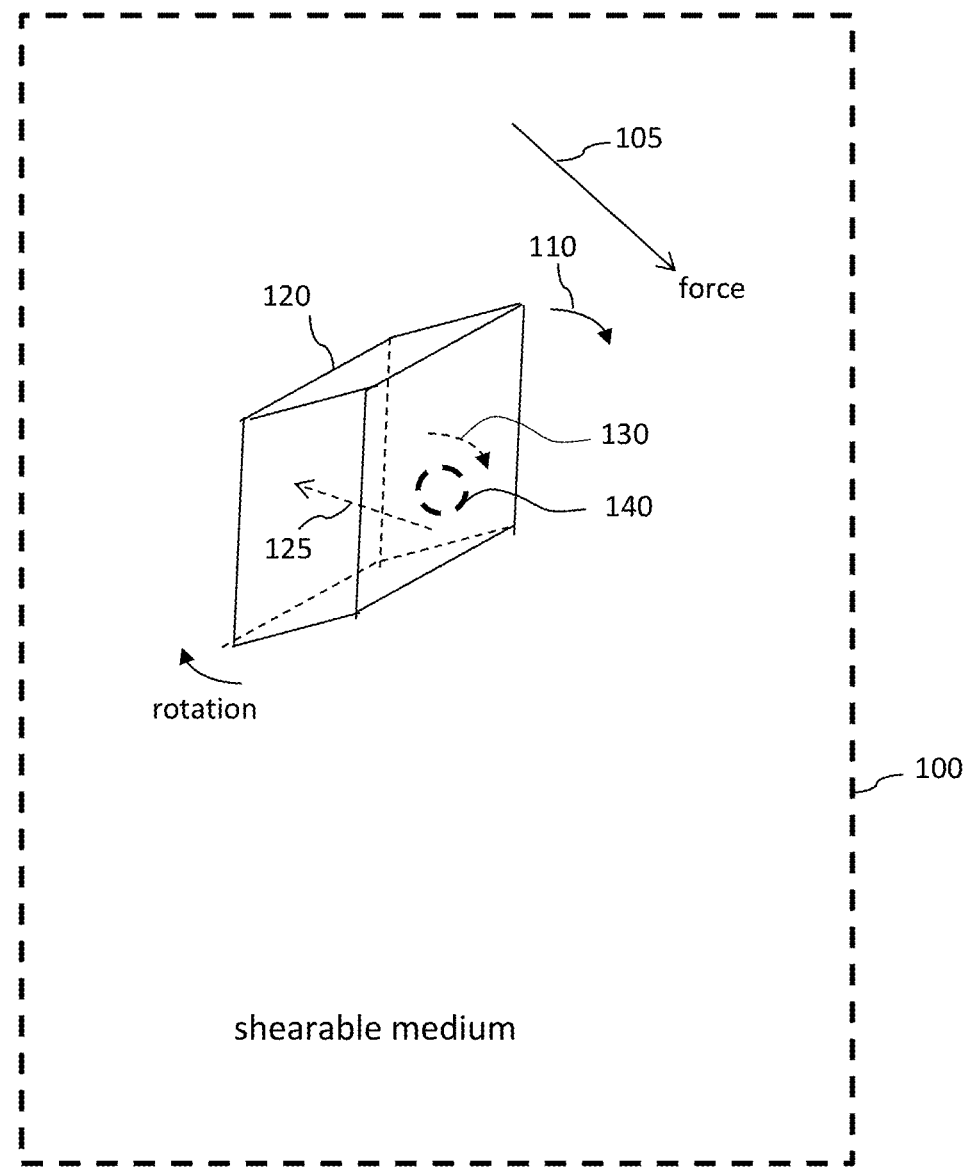
FIG. 1 shows a micro rotation of a three dimensional element within a shearable medium.

I. Glossary coefficients—terms that scale or multiply unit vectors in a tensor. The coefficients can be scalars (numbers) or functions of one or more variables.

coefficient sets $C1, C2, C3 \ldots$ Each coefficient set $C1, C2, C3 \ldots$ belongs to tensors $T1, T2, T3, \ldots$ respectively. When a particular tensor has many terms, each with different directional components, its coefficient set refers to all the coefficients in the tensor rather than a single coefficient in a single term. In a particular dependency of a second tensor on a first, one, a few or all the coefficients in the coefficient set of the second tensor can be altered.

dependency—a condition wherein any one or more of parameters and coefficients of one tensor used to derive one physical quantity becomes dependent on or becomes a function of any one or more of parameters and coefficients of another tensor used to derive another physical quantity.

derive—produce a magnitude, direction or both of a desired physical quantity by extracting a magnitude, direction or both from one or more components of a tensor, or by computing a magnitude, direction or both of a physical quantity from any one or more additive and multiplicative operations between two tensors that are the same or differ from one another.

element—a three dimensional micro structural unit enclosed by planar faces whose size and shape is determined by any one or more of a material lattice, a molecular shape, an organic structure, a material grain, packing of grains or phases in a material and direction and extent of a tensor. It can be virtual in the sense that it is defined by a direction and magnitude of a quantity derived from a particular tensor. Or it can be virtual in the sense that its edges connect atoms in a molecule. But it can also be a material grain, nanoparticle, part of a material lattice or a part of a biological organism.

faces—planar sections whose edges form shapes such as rectangles, triangles and hexagons. The planar sections as a set enclose an element.

formulae—sets of variables multiplied, divided, or added to one another to calculate coefficients of a tensor.

function sets $F1, F2, F3 \ldots$ sets of formulae, functions and equations used to calculate coefficients of tensors $T1, T2, T3 \ldots$ Separate coefficients in a single tensor can be calculated from different functions and formulae.

micro structure—a structure on a small length scale such as a subatomic, atomic, nanometer, micron or millimeter length scale.

monolithic—pertaining to a material lattice without embedded rods, fibers, layers or surface structures produced by lithography. It also encompasses biological and organic structures that can be modeled with elements enclosed by planar faces.

parameter—a particular term or variable inside a formula or function that is a coefficient of a tensor. A single parameter can denote an amplitude, frequency, phase, density, energy, angle or mass, for example, without being an entire function used to compute a coefficient of a tensor.

parameter sets P1, P2, P3 . . . A parameter set is collection of all parameters used to calculate coefficients of a particular tensor. Sets P1, P2, P3 . . . belong to tensors T1, T2, T3 . . . respectively. When one tensor becomes dependent upon another, a single parameter in a single coefficient can be altered. Other dependencies alter a few or all the parameters in the coefficients of a tensor.

physical quantity—a quantity inside a material structure such as a displacement, strain, stress, electronic configuration, potential energy, potential energy per unit volume, or gradient in potential energy that can be derived from one or more tensors.

planar faces—sections of planes or facets that enclose a three dimensional element and whose edges outline shapes such as rectangles, triangles, hexagons and parallelograms with oblique angles. The surfaces enclosed by the edges are flat rather than curved.

rotation—an angular displacement of a three dimensional element enclosed by planar faces that results in a rotational strain in a shearable medium. A pivot point for rotation of an element can be anywhere in the interior, on a face, or on a vertex of that element. Similarly, a rotation axis can pass anywhere through the interior of an element. A rotational axis can also be along a face or through a single vertex of an element.

scalar—a number denoting a physical quantity without specifying a direction. A tensor of order zero is scalar. Examples of scalars include mass and energy. A coefficient denoting a magnitude of a component of a vector or tensor or order two or more can be a scalar.

shearable medium—a medium in which a force can be applied parallel to the plane containing the area upon which the force is applied. A shearable medium is not a fluid and can be a solid, or a portion of solid between planar faces of two elements.

stability—a state in which a particular test criterion is satisfied in a coefficient of a tensor. Stability in this sense can mean that a coefficient can propel a model of a new energy configuration forward once a test criterion is satisfied.

successive—pertaining to two or more tensors or rotations of elements in space that partially define a model of a structure.

tensor—a variable whose order indicates how many unit vectors specify a direction in each component. A tensor of order zero is a scalar and a tensor of order one is a vector. Tensors of order two or more are formed by the juxtaposition of two or more vectors. If the order is one or more, each component consists of a function or scalar as a coefficient and one or more unit vectors that specify a direction.

tensors T1, T2, T3 . . . Variables used to derive a physical quantity, each of which has its own function set F1, F2, F3 . . . used to compute its coefficients.

unit vector—a variable of magnitude one in a tensor that specifies a single coordinate direction in an orthogonal coordinate system.

II. Description

Figure 2:
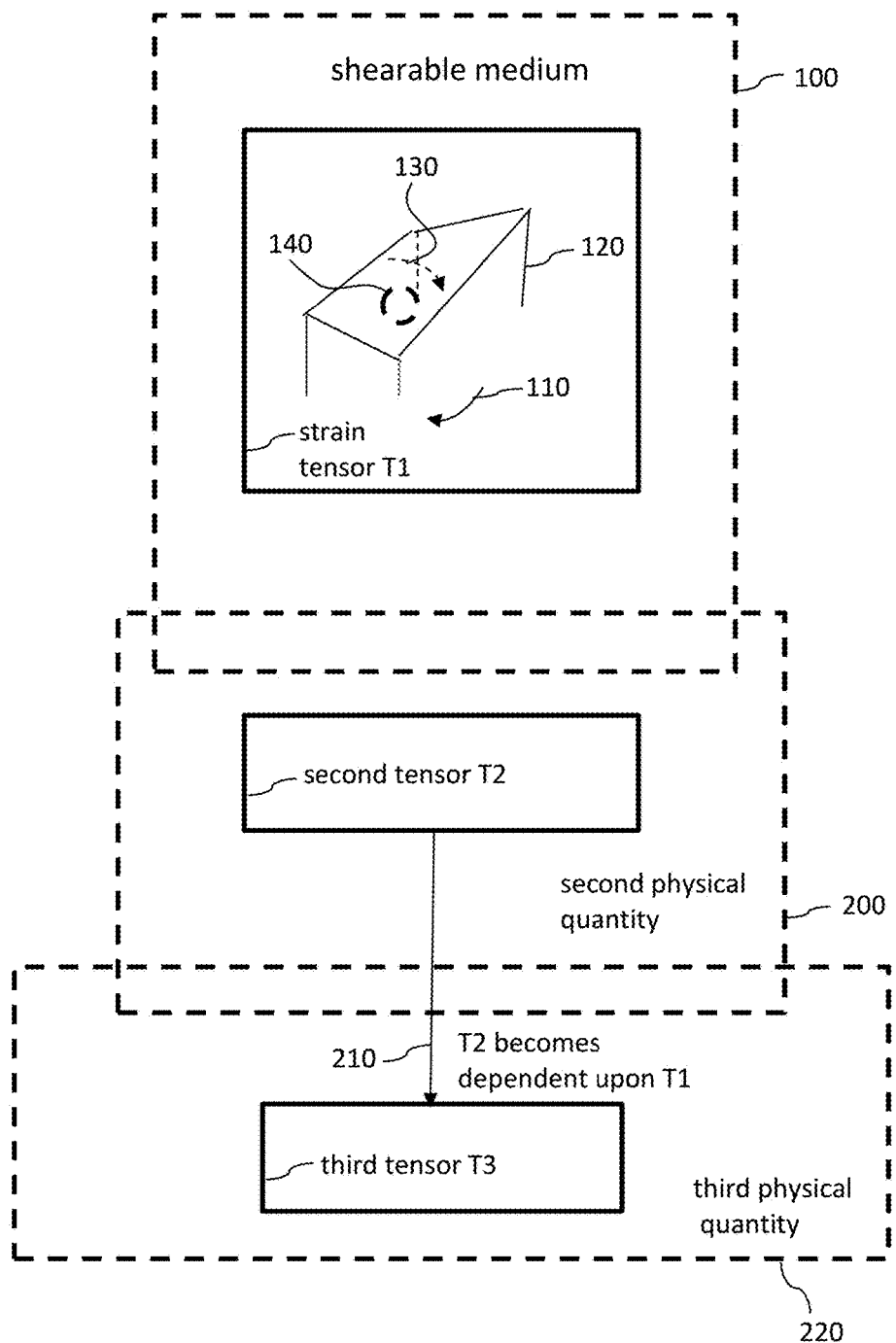
FIG. 2 shows a strain tensor arising from a micro rotation and second and third physical quantities derived from tensors that become dependent upon the strain tensor.
Figure 3:
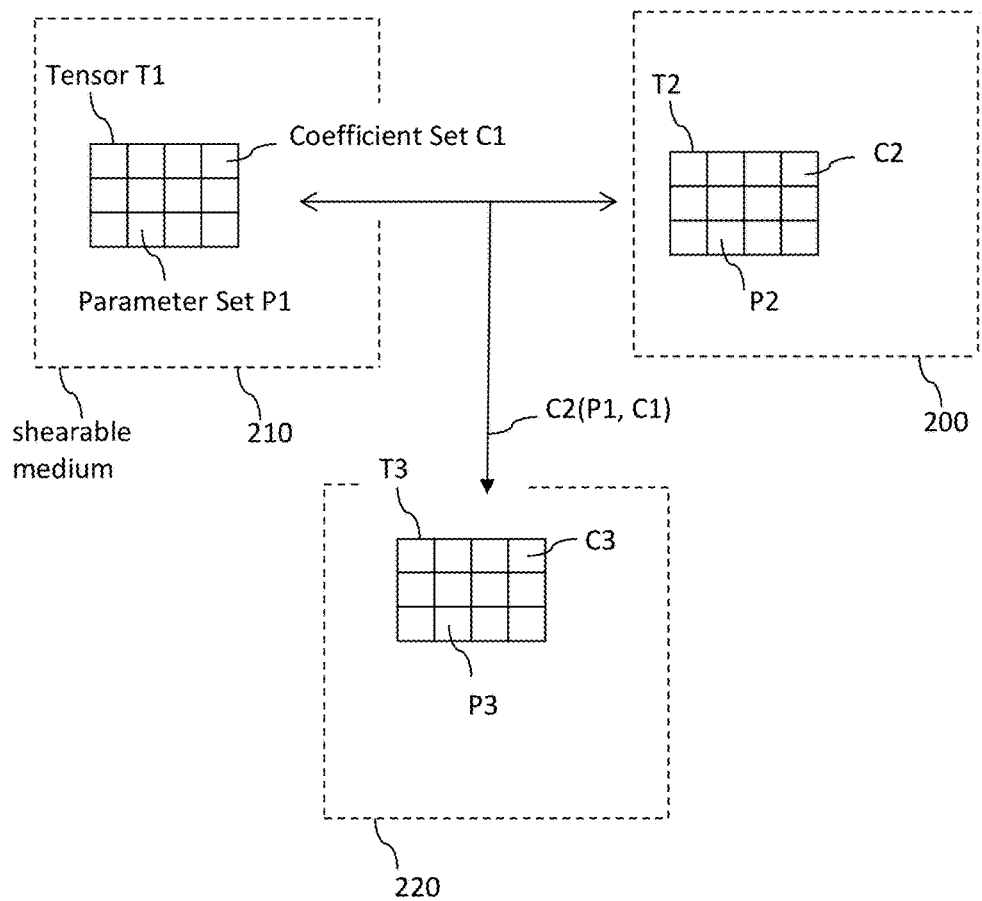
FIG. 3 shows parameters and coefficients of a first tensor for a rotation in a shearable medium and the coefficients of tensors of other physical quantities becoming dependent upon those of the first tensor.

Reference will be made to FIGS. 1 through 8 to define a model of a structure. FIGS. 1 through 3 introduce a rotation, three dimensional elements, a rotational displacement in a shearable medium, physical quantities and dependency of one tensor on another. Several examples of a sequence of tensors, elements and rotation used to model a structure are illustrated in FIGS. 4 through 8.

A micro structure comprises a shearable medium 100, within which a rotation 110 occurs, as shown in FIG. 1. A rotation 110 gives rise to a rotational strain within a shearable medium 100 that is a result of a rotation of a three dimensional element 120 enclosed by planar faces, also shown in FIG. 1. For one or more elements 120 that undergo a rotation 110, at least one vertex, edge, face, or an element as a whole, is embedded in a shearable medium 100.

A shearable medium 100 in FIG. 1 is not a fluid and is a medium which a force can be applied parallel to a planar area within that medium. A shearable medium 100 is not limited to a solid within which all three dimensional elements for a particular model are embedded. Walls of one or more elements might be shearable, with a fluid, which can be a liquid or a gas, in the interior of one or more elements, with yet another shearable medium between adjacent and parallel faces of different elements. This last shearable medium between parallel faces could bear a rotational strain as elements rotate or twist. An illustration of a structure of this type is given in FIG. 8. A structure is not limited to examples given here but in general comprises a shearable medium that further comprises a rotational strain.

Figure 8:
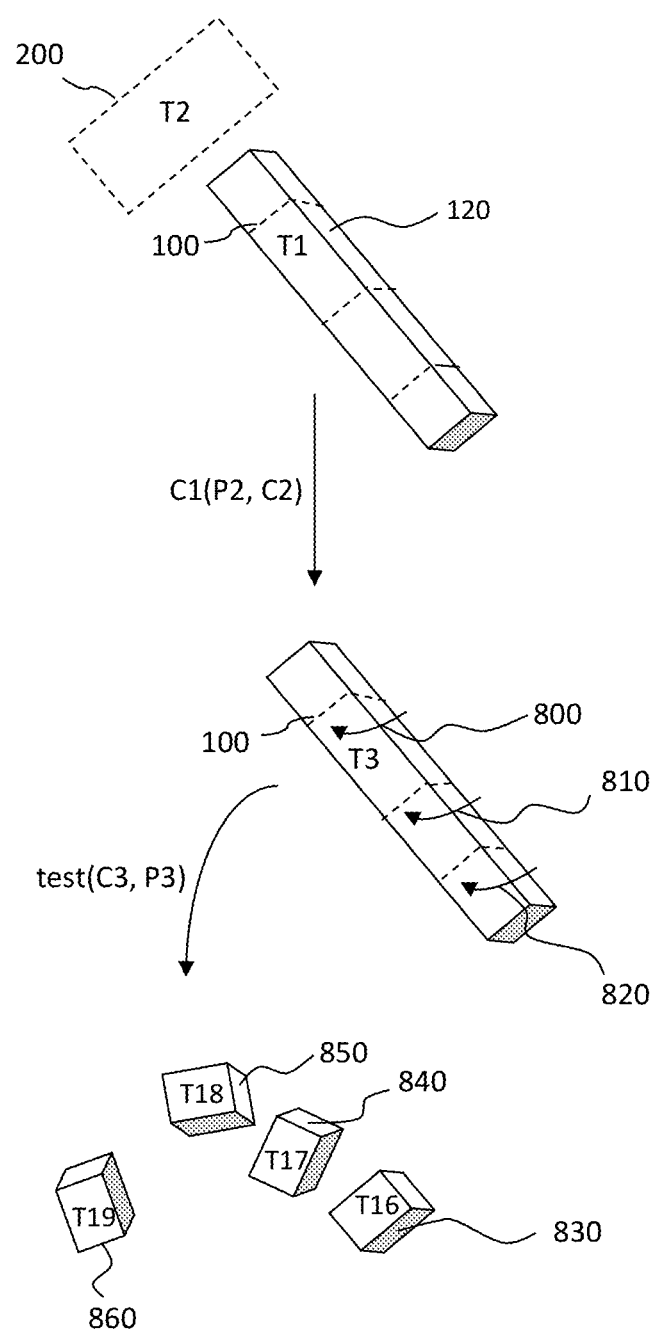
FIG. 8 shows a breakup of a micro structural element into a plurality of separate elements from rotational displacement within a shearable medium.

A structure is monolithic in the sense it does not contain deposited layers, embedded rods, or surface patterns produced by lithography. An element 120 in FIG. 1 is three dimensional and enclosed by planar faces, and can simply be defined by a direction and extent of a particular component of a tensor. An element 120 can be a material grain, a section of material lattice or part of an organic structure. Vertices and edges of an element can model an atomic cluster or molecule. An element can have any of various dimensions and symmetry, and shown in FIGS. 1, 4 and 6. An element is not limited by these examples but is defined as three dimensional and enclosed by planar faces. When one tensor becomes dependent upon the other, an element can either retain or change its shape, or divide into a plurality of smaller elements, as shown in FIG. 8.

A rotation 110 in FIG. 1 can arise from any one or more of several sources. A rotation 110 can be caused by a force 105, for example, provided directly by a physical quantity. A rotation 110 in FIG. 1 can also be caused by a change in angular momentum of a physical quantity 140 under a torque 125, which results in a rotation 130. Rotation 130 can have a rotational angle that differs from that of rotation 110, but a rotation 130 from another physical quantity can carry the element 120 along to produce a rotation 110 that results in a strain in a shearable medium 100.

In FIG. 2, an element 120 again undergoes a rotation 110 within a shearable medium that can be a result of an external force or another rotation 130 of a physical quantity 140. A first physical quantity, which can be a rotational displacement, strain, stress or strain energy, arises within a shearable medium 100 as a result of a rotation and can be derived from a tensor T1. A first tensor T1 of order one or more comprises components of rotational displacement or strain as appropriate.

A second physical quantity 200 in FIG. 2, which is within or in the vicinity of a rotated element, can be any one or more of a stress, strain, potential energy, potential energy per unit volume, or gradient in potential energy. A second physical quantity 200 can be derived from a tensor T2, whose coefficients can be derived from a sum of constants and trigonometric functions. Tensor T2 can have other functions that compute strain and stress in and around intricately shaped elements.

A physical quantity being derived from a tensor means that any one or more of a magnitude and direction of a physical quantity can be computed from a component of a tensor, or from an operation, such as a product of tensors.

Derivation from a tensor might also mean that a physical quantity can be computed from functions that form the coefficients of a tensor. In a mode in which a tensor denotes successive coordinates of a curved path, for example, a curvature of part of the path might be computed and a potential energy becomes dependent upon that curvature. In a preferred mode, a model for a structure is run on a device comprising a processor that computes the aforementioned rotational strain, coefficients, and physical quantities, such as a potential energy.

A third physical quantity 220 in FIG. 2 can be derived from a third tensor T3 whose parameters and coefficients are the result of parameters and coefficients of tensor T2 becoming dependent upon parameters and coefficients of a first tensor T1. A dependency 210 shown in FIG. 2 is that of coefficients and parameters of T2 becoming dependent upon coefficients and parameters of T1.

FIG. 3 shows tensors and their parts in a model of a structure. Each tensor T1, T2 and T3 can be of order one or more. A tensor of order one is a vector, whose components have a direction in space as well as coefficients that define a magnitude of each component. Tensors of order greater than one comprise additional unit vectors in an orthogonal coordinate system that specify directions of physical quantities. Regardless of an order of a tensor, its coefficients can vary with both time and position through formulae and functions used to calculate the coefficients. Collectively, coefficients of a single tensor are shown in FIG. 3 as a Coefficient Set, with Coefficient Sets C1, C2, C3 . . . corresponding to tensors T1, T2, T3 . . . respectively.

Similarly, Parameter Sets P1, P2, P3 . . . in FIG. 3 correspond to tensors T1, T2, T3 . . . respectively. A parameter differs from a coefficient in that a parameter can be a single term inside a function or inside formula used to compute a coefficient. A coefficient, in contrast, can compute or is an entire magnitude of a single component of a tensor.

Each tensor T1, T2 and T3 in FIG. 3 used to model a structure has formulae and functions of one or more variables that calculate coefficients of its components. Each of these formulae and functions can further comprise one or more stability parameters that need not constitute an entire formula, equation or function as a whole. An example of a parameter is an amplitude, frequency or phase of a trigonometric function. A dependency of one tensor on another can comprise a change in one or more parameters in a single coefficient, a change in one or more parameters in a plurality of coefficients, a change in one or more coefficients as a whole, or a change in a form of a function used to calculate any of the coefficients.

In FIG. 3, any one or more of coefficients in set C2 become dependent upon any one or more of the parameters in set PI and coefficients in set C1 to become a coefficient set C3 for tensor T3. This dependency is shown by the term C2(P1, C1). Functions used to compute the coefficient set C3 in T3 have their own parameter set P3. An example of a dependency is a frequency parameter in a trigonometric function denoting a path becoming dependent upon a strain that provides an open space or change in that path.

Figure 4:
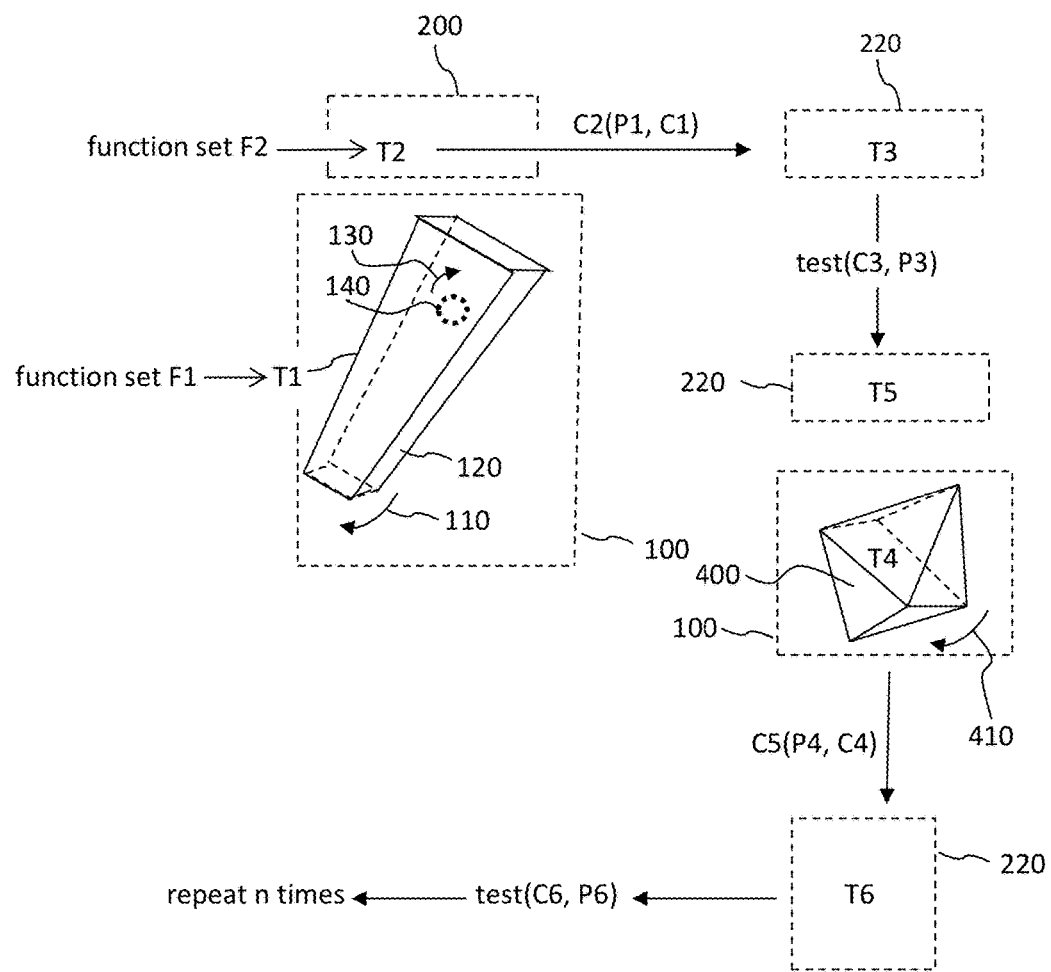
FIG. 4 shows tensors that are used to derive potential energy becoming successively dependent upon rotation of elements.

An example of a structure with a model depicted in FIG. 4 is one in which a configuration of potential energy is repeatedly altered by several three dimensional elements that rotate. An element 120 again undergoes a rotation 110 to produce a displacement and strain within a shearable medium 100. A rotation 110 can be from any one or more of an external force, a force provided by physical quantity 200, or a rotation 130 arising from a change in angular momentum of physical quantity 140.

Although physical quantity 200 is shown in the space above an element 120 in FIG. 4, physical quantity 200 can extend into or even be within an element 120. Function sets F1 and F2 shown as labels in FIG. 4 are used to calculate coefficient sets C1 and C2 belonging to tensors T1 and T2 respectively. Labels F1 and F2 appear in FIG. 4 to emphasize that different coefficients of a single tensor can be calculated by different functions. In what follows in FIGS. 4 through 8, function sets F1, F2, F3, . . . , although they do not specifically appear as labels, are used to calculate coefficients in the coefficient sets C1, C1, C3 . . . belonging to tensors T1, T2, T3 . . . respectively.

At the top of the FIG. 4, a dependency denoted by C2(C1, P1) means that any one or more of coefficients in set C2 becomes dependent upon any one or more of parameters in set P1 and coefficients in set C1 to become a coefficient set C3 with its associated parameter set P3 belonging to tensor T3. Tensor T3 is used to derive a third physical quantity 220. An example of physical quantity 200 is a potential energy of one or more electrons. After element 120 rotates, potential energy 200 acquires a configuration in space dependent upon rotational displacement and can be derived from a tensor T3 with coefficients altered from those of T2.

A structure can include a test of a parameter, coefficient or component of a tensor against one or more criteria to determine whether further change in a tensor will occur. Examples of criteria are a critical value of a parameter, a critical direction of a vector, or a critical value of a function. It can also be a combination of a value of a function, one or more operations on a function, and a number and spacing of particular places in a configuration. The number and spacing of inflection points in a curved path is an example of this latter combination.

Inside a structure a configuration belonging to physical quantity 220 might change its shape, for example, in response to an extended environment around it or from a conversion of some potential energy to another form of energy. In a model of a structure, a test criterion, displayed as test(C3, P3) in the upper right of FIG. 4, can determine how much and in what manner function set F3 alters to another function set F5 to produce another coefficient set C5 belonging to tensor T5.

Tensor T5 can in turn become dependent upon tensor T4 that arises from a rotation 410 of element 400 within a shearable medium 100. Element 400 can have a different or same size and symmetry as element 120. Likewise, a rotation angle for rotation 410 can be different or the same as that of rotation 110. A second dependency labeled C5(P4, C4) in FIG. 4 can occur to produce tensor T6. The coefficients and parameters of tensor T6 can be further tested through a criterion denoted test(C6, P6) at the bottom of FIG. 4.

The term repeat n times at the bottom of FIG. 4 means that dependencies C2(P1, C1) and C5(P4 C4), by themselves, or in combination with any one or more of the operations test(C3, P3) and test(C6, P6), can be repeated n times, where n is an integer of one or greater.

Figure 5:
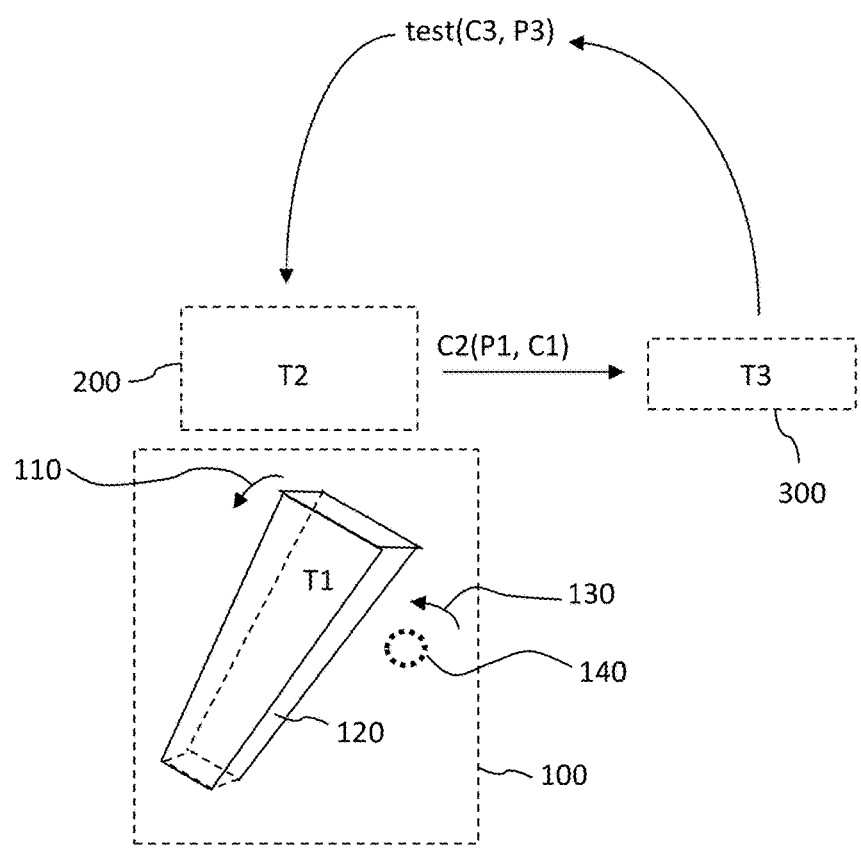
FIG. 5 shows a second physical quantity being altered more than once as the coefficients of a tensor used to derive the second physical quantity become dependent upon parameters and coefficients of a tensor from a rotation within a shearable medium.

In FIG. 5, an example of a structure modeled by tensors T1 and T2 is an electronic configuration that repeatedly alters until it closely matches or is compatible with an electronic configuration on or inside a micro structural element. Alternatively, stability might occur when an electronic configuration derived from T2 separates from that of a micro structural element.

As in previous examples, a rotational displacement or strain occurs within a shearable medium 100 in FIG. 5. The displacement or strain, whose magnitude is in various components of tensor T1, arises from a rotation 110 of element 120. Rotation 110 can again be from an external force or from a rotation 130 that arises from and change of angular momentum of physical quantity 140.

In FIG. 5, a physical quantity 200 remains in the same region of space but gets repeatedly altered by a rotation 110 of element 120. Physical quantity 200 can be near, on or inside element 120. Tensor T2 used to derive physical quantity 200 is initially independent of a displacement or strain tensor T1, however. A test(C3, P3) in succession with a dependency C2(P1, C1) in FIG. 5 occurs repeatedly until a test criterion test(C3, P3) is satisfied for stability.

Figure 6:
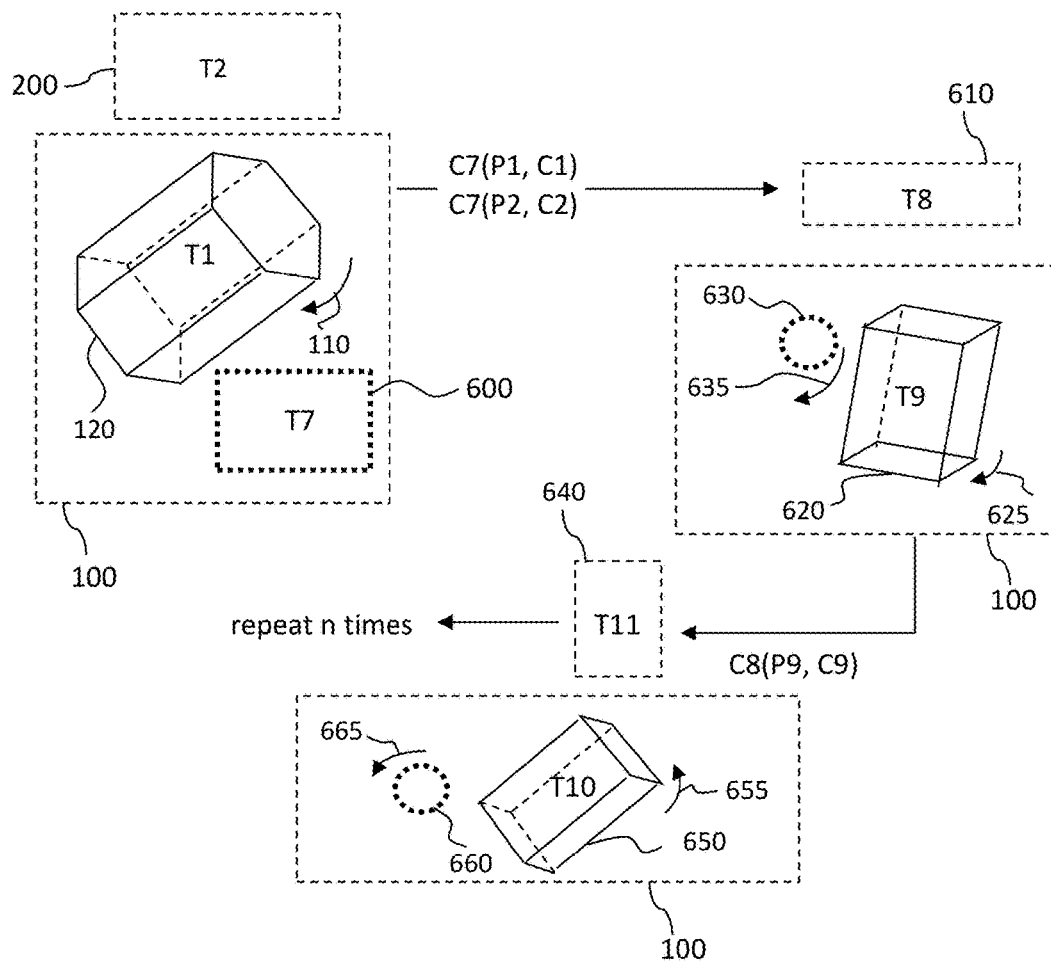
FIG. 6 shows a second physical quantity first being altered by a rotation of an element before a tensor for a third physical quantity becomes dependent upon the second tensor. The third physical quantity is then altered by rotation of other elements within the shearable medium.

In FIG. 6, an example of a structure whose model is illustrated is one that has a configuration potential energy 600 affected by both a rotation 110 of an element 120 in a shearable medium 100 and an incoming electrical field or mechanical stress 200 that can be derived from tensor T2. A double dependency C7(P1, C1) and C7(P2, C2) of tensor T7 on both T1 and T2 is indicated to produce tensor T8 that can be used to derive another configuration of potential energy 610.

A new configuration 610 in FIG. 6 then encounters a displacement or strain from a rotation 625 of element 620. A rotation 625 could arise from a force from physical quantity 610, which could be a mechanical stress or a potential energy configuration. Rotation 625 could also arise from an external force, or from a rotation 635 arising from a change in configuration or angular momentum of physical quantity 630. A dependency labeled C8(P9, C9) occurs to shows that coefficient set C8 becomes dependent upon parameters P9 and coefficients C9 of a tensor T9 used to derive rotational displacement or strain. The result is a tensor T11, which can be used to derive a stress or potential energy configuration 640.

The quantities 610 and 640 in FIG. 6 could be simply different configurations of a stress or potential energy, or they could be wavelike and differ from one another by traveling in different directions. A structure is not limited by these examples of physical quantities, but is modeled by successive dependency of tensors, some of which compute rotational displacement or strain from rotation within a shearable medium.

Tensor T11 in FIG. 6 can then become dependent upon a tensor T10, which computes a displacement or strain from a rotation 655 of element 650. Element 650 can have the same or a different size and shape as element 620. Likewise, a rotation 655 can have a rotational angle that is the same or differs from that of rotation 625. Again, a rotation 655 can arise from an external force, from physical quantity 640 itself, or from a change in angular momentum and rotation 665 of physical quantity 660. The phrase repeat n times means that a dependency C8(P9, C9) in combination with any further dependencies that alter tensor T11 can occur n times in succession, where n is zero, one, two . . . etc.

Figure 7:
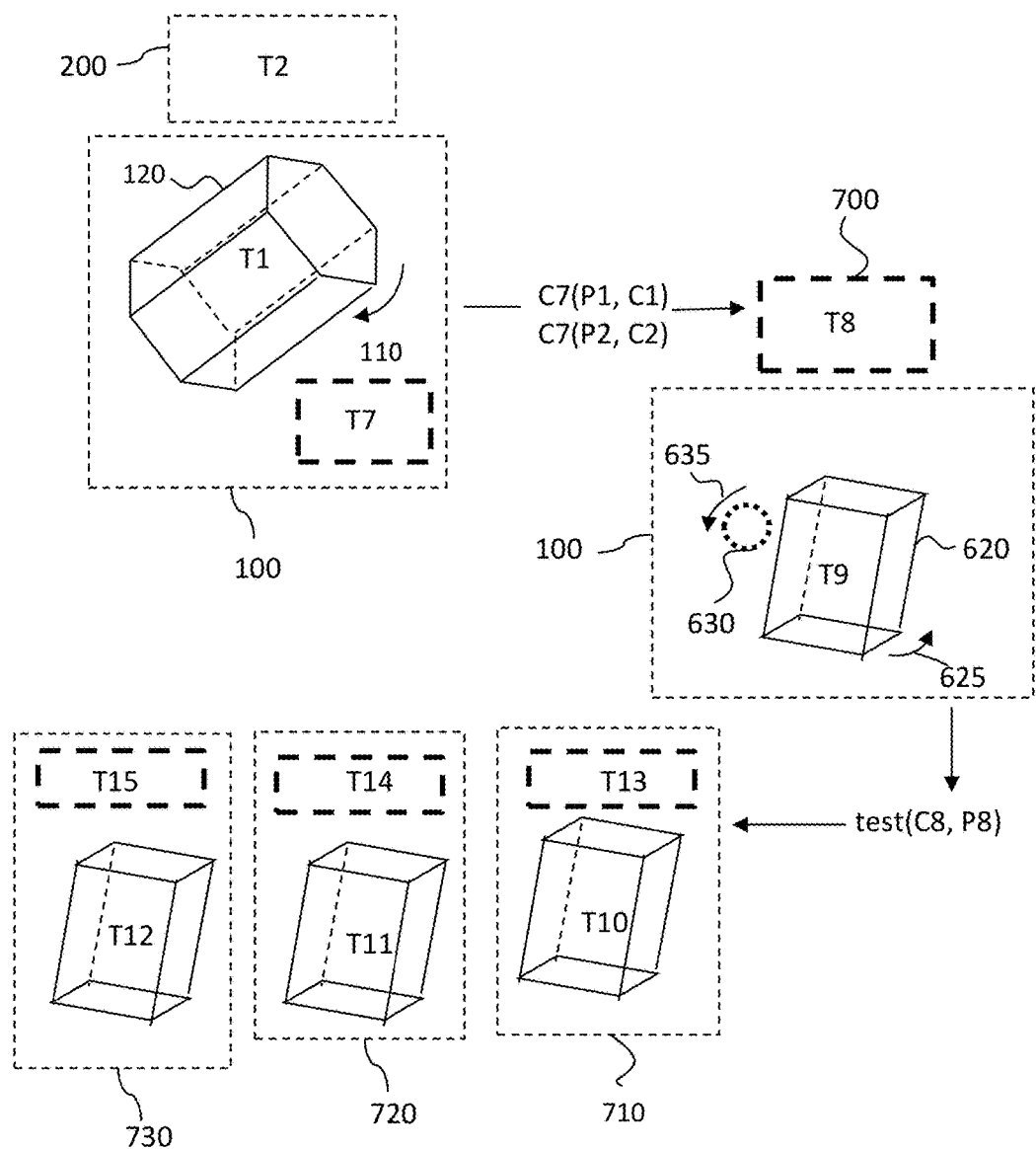
FIG. 7 shows that within the last set of alterations of the third physical quantity of FIG. 6, a third quantity divides into a plurality of other physical quantities within rotating elements.

FIG. 7 shows a model of a structure that begins the same as that in FIG. 6 but differs later. An example of a structure modeled in FIG. 7 is one in which a new configuration of the potential energy makes other energy, stress or charge carriers either move or have different configurations in three separate orthogonal directions.

A tensor T7 in FIG. 7, as in FIG. 6, becomes dependent upon parameters and coefficients of both tensors T2 and T1, as labeled by C7(P1, C1) and C7(P2, C2), to produce tensor T8, from which a physical quantity 700 can be derived. As in a model shown in FIG. 6, tensor T1 has as components rotational displacement or strain that occurs in a shearable medium 100. The rotational displacement or strain results from a rotation 110 of element 120. Tensor T8 then becomes dependent upon tensor T9, which has as its components rotational displacement or strain within a shearable medium 100. Again, the rotational displacement or strain arises from a rotation 625 of element 620, with rotation 625 coming from an external force, physical quantity 700 itself, or a rotation 635 that arises from a change in angular momentum of a physical quantity 630.

At the bottom of FIG. 7, a configuration of physical quantity 700 is tested under criteria that would make it divide into configurations 710, 720 and 730, all of which can be derived separately from tensors T13, T14, and T15, respectively. Each of the configurations 710, 720 and 730 can become dependent upon tensors T10, T11 and T12, respectively, which can be used to derive other physical quantities or other strain from rotation of elements.

FIG. 8 shows a model of a structure in which a three dimensional element breaks up into smaller elements. An element 120 is comprised of smaller elements, which have a shearable medium 100 between faces of said smaller elements. A tensor T1 can derive a stress or strain state that an element 120 initially has.

In FIG. 8, a physical quantity 200, which can be derived from tensor T2, provides a torque that rotates smaller elements in element 120 so that rotations 800, 810, 820 . . . , each of which can be the same or different from one another, give rise to rotational displacement within a shearable medium 100. In this model, it is the tensor T1 that becomes dependent upon parameters and coefficients of T2, as labeled C1(P2, C2), to produce tensor T3, from which strain and strain energy of a twisted element 120 can be derived.

In a structure modeled as in FIG. 8, if enough strain energy builds up, or if conditions are met in trigonometric functions used to model strain energy, as labeled by test(C3, P3), element 120 separates into separate elements 830, 840, 850, 860 . . . Each of elements 830, 840, 850, 860, . . . can have its own tensor T16, T17, T18, T19, . . . respectively, to derive its new potential energy configuration.

An example of a test criterion test(C3, P3) in FIG. 8 might be a strain energy computed from one or a plurality of coefficients in T3. Alternatively, T3 might model a curved path of a gradient in potential energy. If a strain energy becomes too large, or if too much energy is in a too tightly curved path, energy might change its path, with a concurrent separation of an element into smaller elements.

A structure can have a model that combines that shown in FIG. 8 with any one or more of models shown in FIGS. 3 through 7. Tensor T2 at the top of FIG. 8, for example, might repetitively undergo another separate dependency with another tensor, as shown in FIG. 5, to get physical quantity 200 in FIG. 8 into its final state before it provides a torque to separate element 120 in FIG. 8. Tensor T3 in the middle of FIG. 8 might then undergo a repetitive transformation with T2 as in FIG. 5 to get into a state that satisfies a test criterion. Modes and embodiments of a structure having a model here are not limited to any one of the models depicted in FIGS. 4 through 8, but can be a combination of any two or more of models illustrated.

What is claimed:
1. A monolithic micro structure comprising
   a) one or more three dimensional micro structural elements enclosed by planar faces wherein said elements have a size and shape determined by any one or more of a section of a material lattice, atomic cluster, molecule, an organic structure, a material grain, packing of grains and material phases, wherein said elements further comprise a rotation axis that can pass anywhere through said elements, along a face or through a vertex of said elements, and wherein said elements undergo a rotation that is about said rotation axis and that arises from any one or more of a force, a rotation of a physical quantity and change in angular momentum of a physical quantity;

b) a shearable medium between any two or more of said planar faces of said elements, wherein said shearable medium further comprises a rotational strain that arises from said rotation of one or more said elements, and wherein said rotational strain can be derived from a first function set that computes rotational strain and stress on and around said planar faces of said elements;

c) a physical quantity that can be derived from a second function set that comprises constants and trigonometric functions and wherein said second function set is successively dependent upon parameters of said first function set of said rotational strain in (b).

2. A monolithic micro structure comprising a) one or more three dimensional micro structural elements enclosed by planar faces wherein said elements have a size and shape determined by any one or more of a section of a material lattice, atomic cluster, molecule, an organic structure, a material grain, packing of grains and material phases, wherein said elements further comprise a rotation axis that can pass anywhere through said elements, along a face or through a vertex of said elements, and wherein said elements undergo a rotation that is about said rotation axis and that arises from any one or more of a force, a rotation of a physical quantity and change in angular momentum of a physical quantity;

b) a shearable medium between any two or more of said planar faces of said elements, wherein said shearable medium further comprises a rotational strain that arises from said rotation of one or more said elements, and wherein said rotational strain can be derived from a first function set that computes rotational strain and stress in and around said planar faces of said elements;

c) a stress or strain that can be derived from a second function set and wherein said second function set is successively dependent upon parameters of said first function set of said rotational strain in (b).

* * * * *